April 6, 1926.
I. I. ZIPERSTEIN
1,579,589
WHEEL
Original Filed Sept. 22, 1921   2 Sheets-Sheet 1
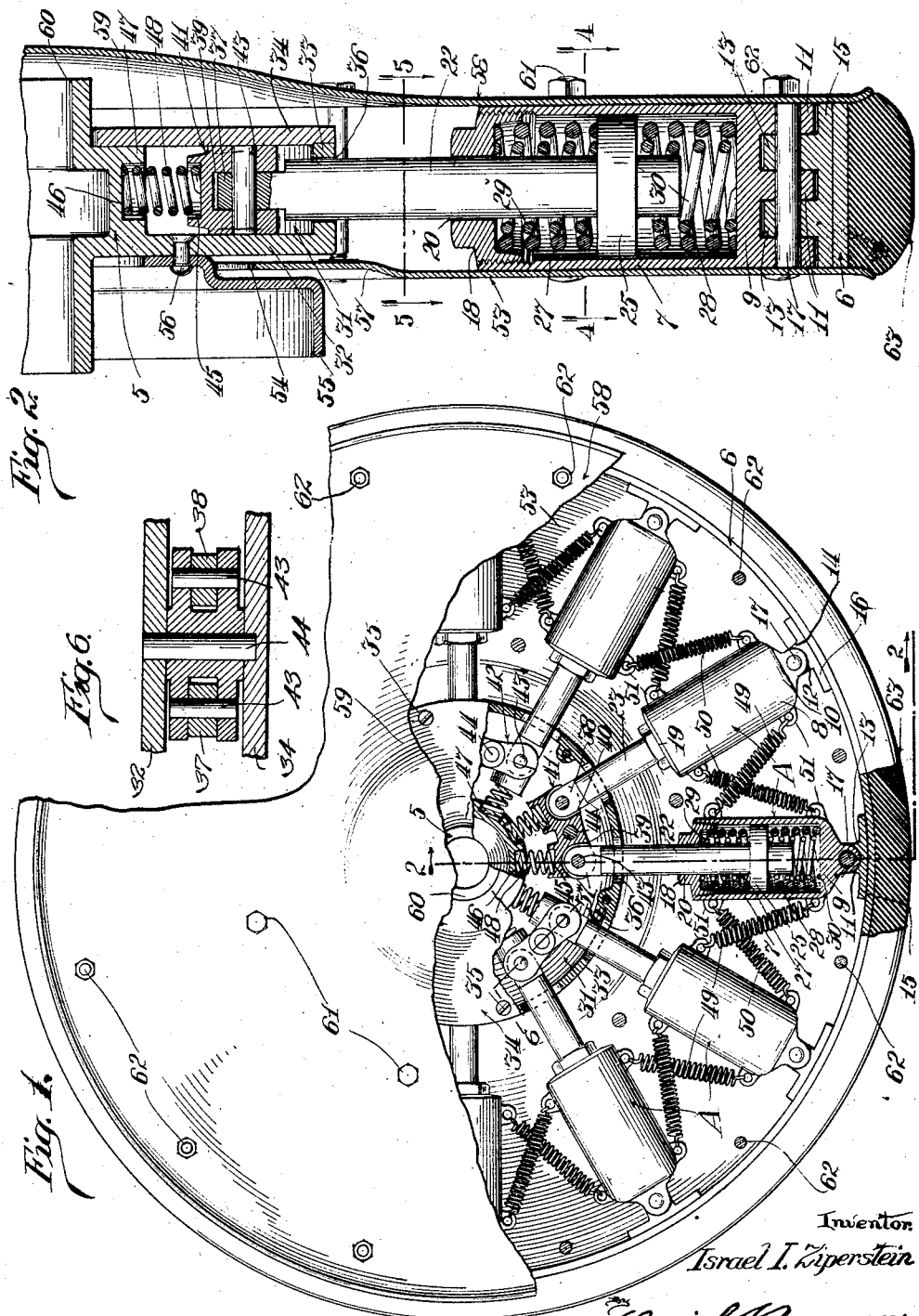
Inventor
Israel I. Ziperstein
Daniel F. Brennan
Attorney April 6, 1926.
I. I. ZIPERSTEIN
1,579,589
WHEEL
Original Filed Sept. 22, 1921   2 Sheets-Sheet 2
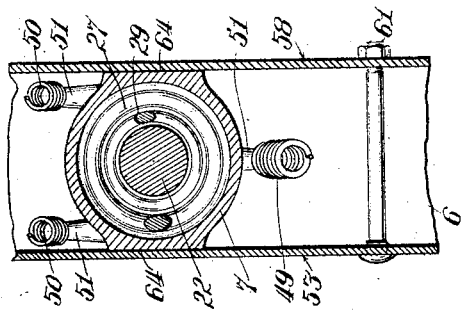
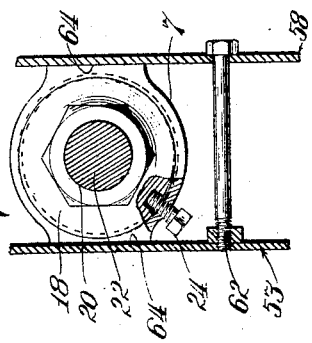
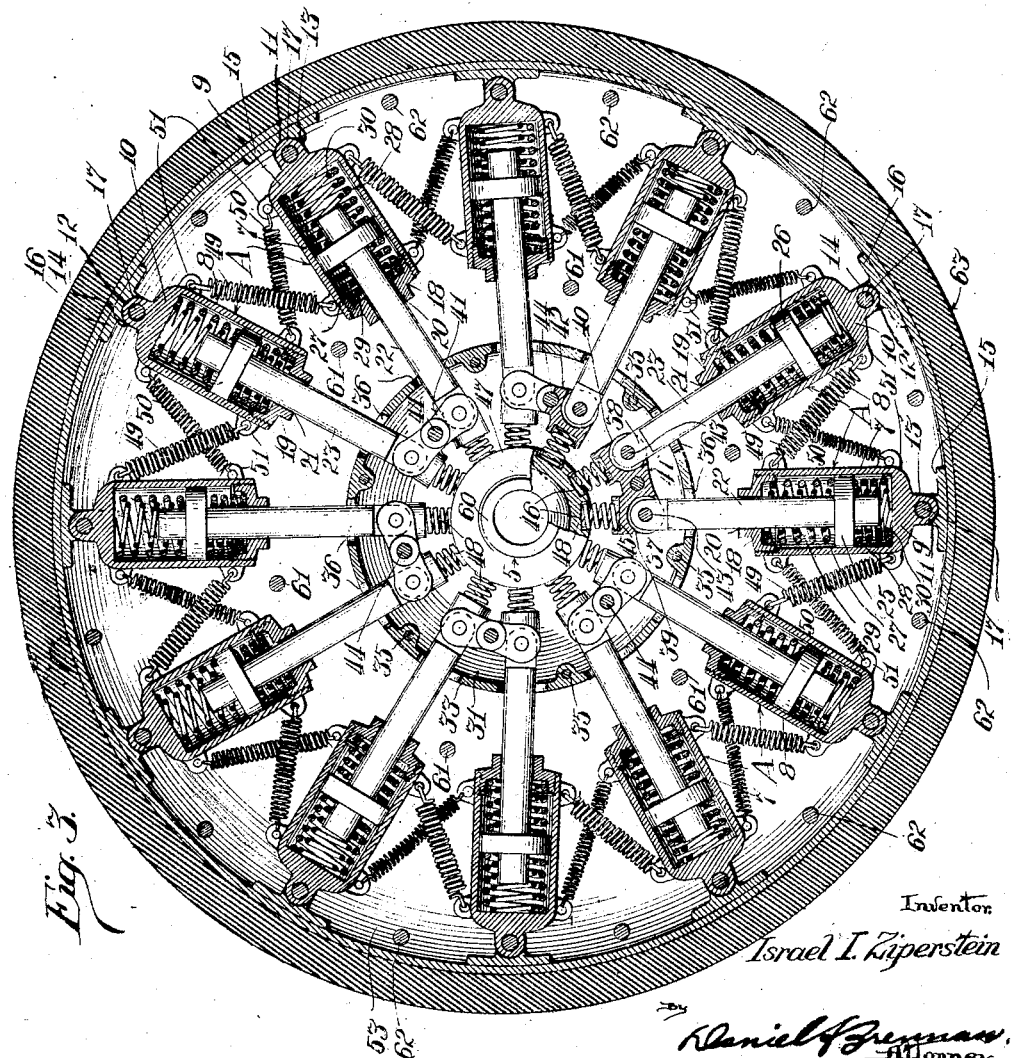

Patented Apr. 6, 1926.

1,579,589

UNITED STATES PATENT OFFICE.

ISRAEL I. ZIPERSTEIN, OF CHICAGO, ILLINOIS, ASSIGNOR OF ONE-HALF TO HARRY S. HANDLER AND TEN PER CENT TO MORRIS M. NEWMAN.

WHEEL.

Application filed September 22, 1921, Serial No. 502,449. Renewed November 15, 1924.

*To all whom it may concern:*

Be it known that I, ISRAEL I. ZIPERSTEIN, a citizen of Poland, residing at Chicago, county of Cook, and State of Illinois, have invented a new and useful Improvement in Wheels, of which the following is a specification.

This invention relates to that class of vehicle and other wheels, commonly known as resilient wheels, and pertains more particularly to spring wheels, the primary aim of this invention being, by means of a novel and improved resilient structural organization, to increase the resiliency and flexibility of such wheels, and thus enhance the efficiency with which the wheel absorbs the shocks incident to travel over a roadway, and thereby prolong the life of the wheel and obviate the use of pneumatic and other costly resilient tires.

Another, and no less important aim of this invention, is to provide a wheel of the class described and embodying the features here presented which is capable of ready installation on any of the modern styles of motor vehicles, and which may be manufactured at low cost and quickly and easily disassembled for repairs or replacement of the parts damaged in service.

Among the more prominent features of the invention, as presented in the preferred embodiment to be described in detail later, are the mounting of the rim and the elements carried thereby so that the hub is a floating structure relative the rim proper; the manner of connecting the rigid spokes or similar instrumentalities in pairs to the hub, yet individually to the rim; the arrangement whereby the resilient structure is completely housed and thus hidden from view and protected against dust and other foreign matter, interfering with the operation; and the two sets of shock and distortion absorbing springs, whereby circumferential as well as radial displacement of the parts is efficiently and readily accommodated.

With other numerous objects and advantages in view the invention takes its preferred embodiment in the structure hereinafter described and claimed, and illustrated in the accompanying drawings, in which:

Figure 1 is a fragmentary side elevation of a wheel embodying the improvements of this invention, parts being shown in section.

Figure 2 is an enlarged vertical sectional view taken on line 2—2 of Figure 1, looking in the direction indicated by the arrows.

Figure 3 is a vertical sectional view through the wheel and its yielding and shock absorbing structure, showing the same generally distorted as in service.

Figure 4 is an enlarged transverse sectional view taken on line 4—4 of Figure 2, and Figure 5 is a similar view taken on line 5—5 of Figure 2, both looking in the direction indicated by the arrows.

Figure 6 is a fragmental sectional view taken on line 6—6 of Figure 1.

Referring more particularly to the drawings, 5 is the hub of the wheel, and may be, as shown, a single casting, or if desired made in suitable sections for application to the axle, not shown. The rim 6 may be a continuous rigid or flexible ring, in this instance preferably rigid, and this rim is connected with the hub by the yielding or resilient mechanical organization to be presently described; so that the hub is in a more or less floating mounting, in other words, free to move radially and circumferentially relatively the rim within limits, while the wheel is rotating in traveling a roadway.

The yielding or resilient shock absorbing mechanism and connecting means for the hub and rim comprises generally a circumferential series of yieldable and yieldingly mounted radial units disposed in complemental pairs A—A, the respective unit pairs and the units of each pair being identical, which necessitates a description of but one of these pairs.

Referring now to one pair of the units, namely, that shown near the lower portions of Figs. 1 and 3, two cylinders 7 and 8 are provided with outer closed end walls 9 and 10, carrying each a lug 11 and 12, respectively, these lugs being perforated and in pivotal engagement with spaced ears 13 and 14 formed integrally upon cleats 15 and 16, respectively, which latter are either spot welded or otherwise fixedly secured to the inner peripheral surface of the rim 6. These cleats might be cast with the rim where the latter is to be rigid. Suitable pins 17—17 pass through the lugs and their respective ears to afford pivots.

Each cylinder is provided with removable inner end walls 18 and 19, in threaded engagement with the respective cylinder, said end wall having openings 20 and 21, respectively, through which the radial spokes or rods 22 and 23 extend and are adapted to reciprocate, the end walls being secured against displacement by set screws, one of which is shown at 24 in Fig. 5. Each of the spokes, adjacent the end thereof disposed in its receptive cylinder, is provided with the pistons 25 and 26, which are adapted to reciprocate with their respective spokes snugly in each cylinder. The ends of the spokes which project beyond the pistons may act as limit stops by engagement with the end walls 9 and 10 of the cylinders. Motion resistent and shock absorbing means are disposed on either side of the pistons and preferably include relatively heavy helical springs 27 and 28, and similarly arranged recoil absorbing helical springs 29 and 30, relatively lighter than the springs 27 and 28. The cylinders and pistons and their associated yieldable elements serve to absorb the heavier shocks encountered in service.

The inner ends of the spokes or rods 22 and 23 lie within a circumferential chamber 31 formed by a radial peripheral flange 32 cast with the hub, and provided with an axial circumferential wall 33, and an annular plate 34, secured to the free margin of the wall 33 by means of machine screws 35. The wall 33 is provided with circumferentially elongated openings 36—36 for the accommodation of the spokes, so as to permit slight circumferential movement of the spokes relative the hub.

The aforementioned inner ends of the spokes are connected to complete the pairs referred to, and to this end are reduced at 37 and 38 for reception in complementally arranged recesses 39 and 40 provided in the extremities of the links 41 and 42 and pivotally connected to the links by pins 43, said links being pivoted for rocking movement on transverse rods 44—44, secured in the flange 32 and lying in suitable counter bores in the removable plate 34. The inner faces of these links are provided with circular recesses 45 in substantial axial alinement with the spokes 22 and 23, and radially disposed relative the axis of the hub. Complementally arranged similar recesses 46 are circumferentially disposed in the annular enlarged portion 47 of the hub 5, suitable helical springs 48—48 being disposed between the ends of said links and the enlarged portion of the hub, the ends of the springs seating in said recesses.

The cylinders 7 and 8 and, in fact, the complete series of cylinders in the wheel are yieldingly interconnected by means of helical springs 49—49 and 50—50, these springs being arranged in crossed pairs between each cylinder and connected to complemental ears 51—51 on the respective cylinders, and thus the relative movement of the cylinders about their respective pivots is had against the tension of these springs.

In order to afford a casing for the yielding or shock absorbing structure of the wheel and to give an appearance of a so-called "disk" wheel, I provide an inner disk or plate 53 having an axial opening 54 of sufficient size to accommodate relative movement of the hub and said disk, as well as to accommodate the brake drum 55 secured at 56 to the flange 32, the disk 53 having a circular depression 57 to further accommodate the brake drum. An outer disk 58 is provided, having an axial concavo-convex portion 59 for accommodating the outer hub sleeve 60, the disks 53 and 58 being firmly, yet detachably connected by inner and outer circumferential series of bolts 61 and 62, the peripheries of the disks being extended sufficiently beyond the rim 6 and flared outwardly as seen in Figure 2 to serve in retaining a solid rubber or other tire 63. As will be observed from Figs. 4 and 5, the cylinders 7 and 8 fit snugly between the disks 53 and 58, and consequently the cylinders are provided with longitudinal flattened surfaces 64—64 which lie in contact with the adjacent plate.

In the general operation of the wheel in service, the weight of the vehicle will cause a slight depression of the axle and hub relative the rim, and the hub will be normally slightly eccentric to the rim. This displacement of the hub will be partly absorbed by the smaller springs 48 and by the springs in the cylinders 7 and 8, of each pair of shock absorbing devices. However, the principal object of the springs 48 is to allow for relative displacement of the rods 22 and 23 of each pair, which is a result of the relatively different positions of the shock absorbing devices about the circumference of the wheel. Sudden and violent shocks produced by the wheel striking projections or deep depressions in the roadway will be effectively taken care of by the springs 27, 28, 29 and 30, and the effects of such shocks upon the smaller springs 48 will only be effective in so far as the relative movement of the shock absorbing units of each pair is concerned. However, minor vibrations, smaller shocks and the like, as well as the relative movement of the units of each pair of shock absorbers during rotation of the wheel will be readily absorbed by the smaller springs 48.

Where the wheel serves as a driving or traction element, the transverse rods 44, acting through links 41 and 42 of each pair of shock absorbers, and the respective cushioned radial spokes and springs associated, therewith, deliver the necessary motion. Obviously, there will be some circumferential distortion of the resilient structure of the wheel under these conditions, and here again the springs 48—48 come into play, together with the springs 49 and 50. This distortion of the shock absorbing structure will under ordinary conditions be amply satisfied by the yielding elements, but where either sudden acceleration or deceleration obtains, the distortion of the spokes is limited by their engagement with the ends of the openings 36. Flexibility of the rim 6 will not materially vary the general operation of the wheel.

The right to make minor changes in structure within the spirit of the invention and scope of the claim is reserved.

I claim:

In a wheel, a hub, a floating rim, and a plurality of radially disposed yieldable members interconnected in pairs in the same circumferential plane, each pair having common pivotal connection to the hub and individual connection with the rim said hub connection including rocking links.

In testimony whereof, I affix my signature at 36 W. Randolph St., Chicago, Illinois.

ISRAEL I. ZIPERSTEIN.